US006310651B1

(12) United States Patent
Mizutome

(10) Patent No.: US 6,310,651 B1
(45) **Date of Patent: *Oct. 30, 2001**

(54) DATA PROCESSING METHOD AND DEVICE FOR USE IN DISPLAY APPARATUS

(75) Inventor: Atsushi Mizutome, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/612,411

(22) Filed: Mar. 7, 1996

(30) Foreign Application Priority Data

Mar. 14, 1995 (JP) .................................................. 7-054269

(51) Int. Cl.[7] ....................................................... H04N 7/01
(52) U.S. Cl. ............................................ 348/459; 348/792
(58) Field of Search .................................... 348/739, 790, 348/792, 793, 441, 443, 459, 715, 718, 671, 674, 554, 555, 558; 345/185, 200, 533, 546, 547, 153; H04N 7/01, 9/64

(56) References Cited

U.S. PATENT DOCUMENTS 4,958,218 9/1990 Katayama et al. ..................... 358/75
4,987,489 1/1991 Hurley et al. ........................ 358/105
5,315,327 * 5/1994 Suzuki ................................ 348/439
5,446,496 * 8/1995 Foster et al. ......................... 348/441

FOREIGN PATENT DOCUMENTS 0462541 12/1991 (EP) ............................... G09G/3/36
0539033 4/1993 (EP) ............................... H04N/5/44
0553830 8/1993 (EP) ............................... G09G/3/36
0558342 9/1993 (EP) ............................... G09G/3/36
0462396 12/1997 (EP) ............................... H04N/5/44
63-065494 3/1988 (JP) ............................... G09G/3/36
63-285141 11/1988 (JP) ............................. G04B/24/26
4-336594 11/1992 (JP) ............................... G09G/3/20
WO90-03705 4/1990 (WO) ............................. H04N/7/00

OTHER PUBLICATIONS

"Television Standards Converter", Sakata et al., NHK Technical Monograph, No. 17, Mar. 1971, pp. 1–40, XP002023754.
"Analysis ID Field Correspondence and Field Memory Capacity In TV Standards Conversion", Kinuhata et al., Electronics and Communications In Japan, vol. 57–A, No. 10, Oct., 1974, pp. 56–63, XP002023755.

* cited by examiner

*Primary Examiner*—Michael Lee
(74) *Attorney, Agent, or Firm*—Fitzpatrick, Cella, Harper & Scinto

(57) ABSTRACT

A data processing system that allows satisfactory display even when the driving condition changes. The data processing system includes a display device, a video data memory which stores video data in which one frame consists of a plurality of fields, and a display data memory which stores display data to be displayed on the display device. A setting unit sets the driving condition for the display device, and thins the video data in units of fields.

27 Claims, 8 Drawing Sheets

ONE FRAME OF TV(NTSC) [tfr1]
TV VIDEO DATA INPUT
FRAME GRAVER MEMORY 7A
FRAME GRAVER MEMORY 7B
γ-CORRECTION & INTERMEDIATE PROCESSING
FRAME BUFFER MEMORY 10A
FRAME BUFFER MEMORY 10B
FLCD OUTPUT (DISPLAY)
td1
ONE FRAME OF FLCD [tfr2]
W : WRITE
R : READ
W —R—: 1-FRAME (fr…)
: FIELD TO BE SKIPPED

DATA PROCESSING METHOD AND DEVICE FOR USE IN DISPLAY APPARATUS

BACKGROUND OF THE INVENTION

1. Field of the Invention

The present invention relates to a display apparatus used for a TV set or the like, and particularly, to a data processing method and device for converting video data into display data, which are suitable for a display apparatus capable of changing the driving condition for a display means.

2. Related Background Art

As display elements used for display apparatuses, elements using an LED array, an electron-emitting element array, an electroluminescence element, an electrochromic element, a plasma light-emitting element, or a liquid crystal element are known. Particularly, a display element using a liquid crystal element is excellent in its ability of reducing weight and size. An active matrix display element or a super twisted nematic (STN) liquid crystal element using a twisted nematic (TN) liquid crystal, a BTN liquid crystal element using a chiral nematic liquid crystal which exhibits two metastable states, and a liquid crystal element using a chiral smectic liquid crystal and called a ferroelectric liquid crystal element or an antiferroelectric liquid crystal element are especially suitable.

In a conventional display apparatus, when the frame frequency of input video data differs from the frame scanning frequency of the display means, the display image may be disturbed. For this reason, an image is displayed by synchronizing the frame frequency of the input video data with the frame scanning frequency of the display element.

However, under poor environmental conditions such as a high temperature and humidity or a low temperature, image data cannot be satisfactorily displayed in some cases. Therefore, the present inventor examined the feasibility of making the driving condition for the display element variable to optimize the display characteristics. As an example, a method of changing the frame scanning frequency of the display element in accordance with the environmental temperature was examined. However, this technique cannot be employed because it causes a difference between the frame frequency of the input video data and the frame scanning frequency of the display means, as described above.

SUMMARY OF THE INVENTION

The present invention has been made in consideration of the above technical problem, and has as its first object to provide a display apparatus capable of changing the condition to enable satisfactory display.

It is the second object of the present invention to provide a data processing method and device suitable for a display apparatus capable of changing the driving condition to enable a satisfactory display.

It is the third object of the present invention to provide a display apparatus capable of performing video/display data conversion while suppressing any difference between the video data and the display data even when the frame frequency of the input video data differs from the frame scanning frequency of a display means, and a data processing method and device for use in the display apparatus.

It is the fourth object of the present invention to provide a display apparatus capable of performing video/display data conversion suitable for intermediate processing, and a data processing method and device for use in the display apparatus.

In order to solve the problem and achieve the above object of the present invention, according to the present invention, there is provided a data processing method for use in a display apparatus for storing input video data and outputting display data based on the stored video data to display means, wherein a relationship between the video data and the display data is changed in response to a driving condition set by setting means for setting the driving condition for the display means.

There is also provided a display apparatus for storing input video data and outputting display data based on the stored video data to display means, comprising setting means for setting a driving condition for the display means, and convert means for changing a relationship between the video data and the display data in response to the driving condition set by the setting means.

There is also provided a display apparatus having display means, video data memory means for storing video data in which a frame consists of a plurality of fields, display data memory means for storing display data to be displayed on the display means, and data processing means for performing read processing of the video data stored in the video data memory means in units of frames to generate the display data to be stored in the display data memory means, comprising setting means for setting a driving condition for the display means, and means for thinning the video data in units of fields in response to the predetermined driving condition set by the setting means.

There is also provided a data processing device for use in a display apparatus, comprising video data memory means for storing video data in which a frame consists of n fields, display data memory means for storing display data to be displayed on display means, data processing means for performing read processing of the video data stored in the video data memory means in units of frames to generate the display data to be stored in the display data memory means, and means for thinning the video data in units of fields, wherein the data processing means reads out video data corresponding to one frame from the video data memory means, the video data consisting of video data of L fields of the n fields constituting an ith frame and video data of (n−L) fields of the n fields constituting an (i+1)th frame.

There is also provided a data processing device for use in a display apparatus, comprising video data memory means including m field memories for storing video data in which a frame consists of n fields in units of fields, display data memory means for storing display data of at least one frame to be displayed on display means, and data processing means for performing read processing of the video data stored in the video data memory means in units of frames to generate the display data to be stored in the display data memory means, wherein display data of one frame is generated by reading and processing video data of n latest fields of video data of m fields stored in the m field memories.

The video data is preferably thinned and converted into the display data for the display means driven at a frame frequency lower than that of the video data.

The video data is preferably data with a frame consisting of a plurality of fields, and the video data is preferably thinned in units of fields and converted into the display data for the display means driven at a frame frequency lower than that of the video data.

Thinning of the video data is preferably performed by inhibiting write processing of the video data in a memory means or by inhibiting read processing of the video data stored in a memory means.

The display means is preferably a display element capable of changing a frame scanning frequency in accordance with an environmental condition.

The display means is preferably a chiral smectic liquid crystal display element or a display element having a ferroelectric liquid crystal arranged between electrodes.

According to an embodiment of the present invention, even when the driving condition is changed, a shift in processing timing caused by the difference between the frame frequency of the input video data and the frame scanning frequency of the display can be compensated for. Since an optimum driving condition for the employed display element can be selected, satisfactory display can be performed.

According to a specific embodiment of the present invention, even with a display element having a low frame scanning frequency, satisfactory display can be performed.

According to another specific embodiment of the present invention, the video data is thinned in units of fields shorter than frames. Therefore, unnatural dynamic image display can be prevented.

According to still another specific embodiment of the present invention, thinning can be performed with a simple arrangement.

According to another embodiment of the present invention, a shift in processing timing caused by the difference between the frame frequency of the input video data and the frame scanning frequency of the display means can be compensated for. Since an optimum driving condition for the display element can be arbitrarily selected in accordance with the environment, satisfactory display or display according to the desire of the user can be performed.

According to a specific embodiment of the present invention, even when the use environment changes, satisfactory display can be performed.

According to another specific embodiment of the present invention, high-contrast display can be performed at a high switching speed without generating crosstalk.

According to a still another embodiment of the present invention, a shift in processing timing caused by the difference between the frame frequency of the input video data and the frame scanning frequency of the display can be compensated for. Since data processing can be performed in units of frames, and an optimum driving condition for the display element can be arbitrarily selected in accordance with the environment, satisfactory halftone display or display according to the desire of the user can be performed.

According another embodiment of the present invention, the input video data is thinned in units of fields shorter than frames. Therefore, smooth processing can be performed to prevent unnatural dynamic image display.

According to another embodiment of the present invention, independently of the difference between the frame frequency of the input video data and the frame scanning frequency of the display, the number of fields to be skipped can be minimized.

According to a specific embodiment of the present invention, a shift in processing timing caused by the difference between the frame frequency of the input video data and the frame scanning frequency of the display can be compensated. Since data processing can be performed in units of frames, and an optimum driving condition for the display element can be arbitrarily selected in accordance with the environment, satisfactory halftone display or display according to the desire of the user can be performed. In addition, unnatural halftone dynamic image display can be further prevented.

According to another specific embodiment of the present invention, access to the memory can be smoothly performed.

According to a further specific embodiment of the present invention, satisfactory halftone display can be performed.

DETAILED DESCRIPTION OF THE PREFERRED EMBODIMENTS

Figure 1:
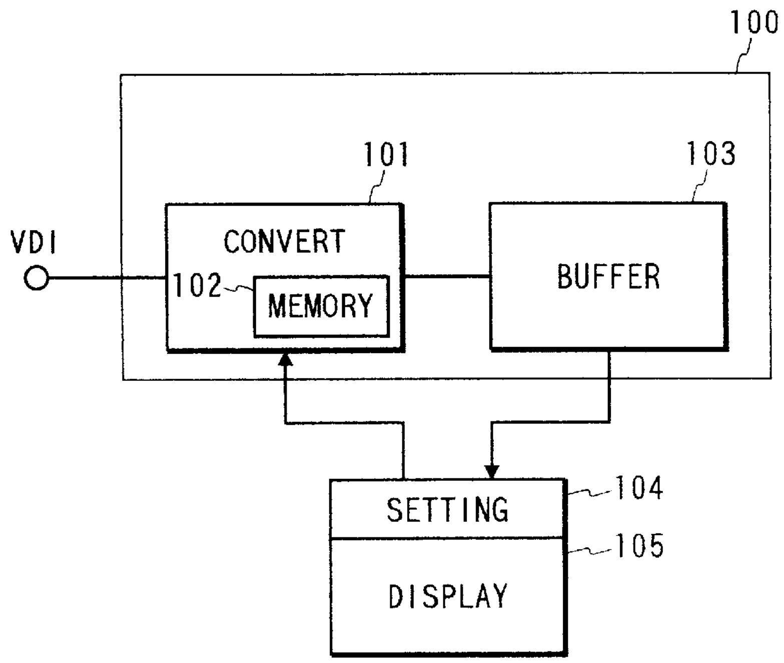
FIG. 1 is a block diagram showing the basic arrangement of a display apparatus according to an embodiment of the present invention.

FIG. 1 is a block diagram showing the basic arrangement of a display apparatus according to a preferred embodiment of the present invention.

A data processing unit 100 has a convert means 101 including a memory 102 serving as a video data memory means for storing video data input from an input terminal VDI, and a buffer 103 serving as a display data memory means for storing display data to be supplied to a display means 105.

A setting means 104 sets the driving condition for the display means 105.

As the memory 102, a semiconductor memory called a DRAM or a VRAM is preferably used. The memory 102 stores video data corresponding to one frame. However, to increase the processing speed, a plurality of frame memories capable of being independently accessed and storing video data corresponding to one frame are preferably prepared such that data can be read out from one frame memory while data is written in another frame memory. When video data has a frame consisting of n fields, n field memories capable of being independently accessed must be provided. More preferably, m ($n<m$) field memories are provided.

As the buffer 103, a semiconductor memory called a DRAM or a VRAM is preferably used. The buffer 103 stores display data corresponding to one frame to be displayed on the display means. However, like the memory 102, a plurality of frame buffers capable of being independently accessed, and storing display data corresponding to one frame are preferably provided such that data can be read out from one frame buffer while data is written in another frame buffer.

As the display means 105, a display element using an LED array, an electron-emitting element, an electroluminescence element, an electrochromic element, a plasma light-emitting element, or a liquid crystal element is used, as described above. Particularly, a liquid crystal display element using a chiral smectic liquid crystal can perform satisfactory display under an appropriate driving condition by using its-memory properties and high-speed switching characteristics. However, in many chiral smectic liquid crystals, the driving characteristics largely depend on temperature. Therefore, when the data processing method of the present invention is applied to a display element of this type, a large effect can be obtained. Similarly, when the present invention is applied to a BTN liquid crystal element, the same effect can be obtained.

The setting means 104 can use a means which changes the scanning period in accordance with environmental conditions such as the environmental temperature or humidity under which the display apparatus is used. Simultaneously, the driving waveform or driving voltage can be appropriately adjusted. A change in environmental conditions can be automatically detected by the display apparatus using a temperature or humidity sensor. Alternatively, an adjustment means can be provided to the display apparatus, so that the user can set the driving condition for obtaining a desired display state.

The driving condition is recognized by the convert means when the driving condition is detected by the convert means 101 at a predetermined timing, or when the driving condition is automatically supplied from the conversion means 104 to the convert means 101.

The convert means 101 thins (skips) video data to be written in the memory 102 by partially omitting write data. Alternatively, when video data is to be read out from the memory 102, part of data is not read out, thereby performing thinning. Data approximately corresponding to one field is preferably skipped during one thinning cycle. With this processing, unnatural dynamic image display is hardly observed.

Figure 2:
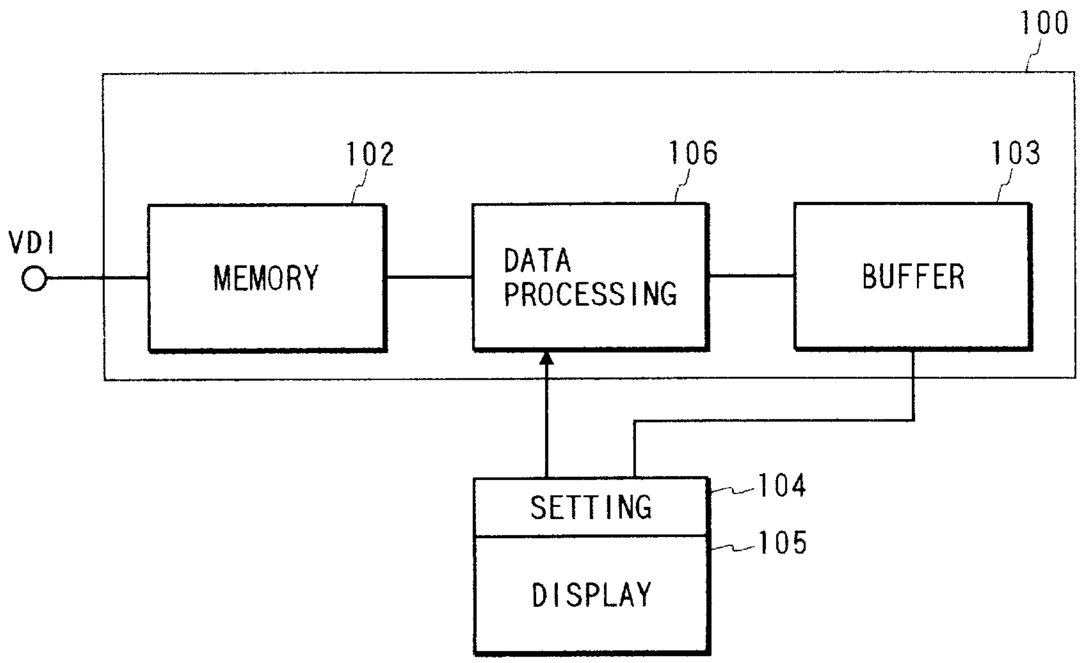
FIG. 2 is a block diagram showing the basic arrangement of a display apparatus according to another embodiment of the present invention.

FIG. 2 is a block diagram showing the basic arrangement of a display apparatus according to another embodiment of the present invention.

A memory 102, a buffer 103, a setting means 104, and a display means 105 are the same as in FIG. 1, and a detailed description thereof will be omitted. A data processing means 106 converts video data stored in the memory 102 into display data. The data processing means 106 also has the same function as that of the convert means in FIG. 1. In data conversion, pseudo halftone processing of a signal is performed using a dither method, an error diffusion method, or an average error minimizing method, and gradation data corresponding to pixels for multivalued display is converted into pseudo gradation data corresponding to pixels for binary display. Therefore, binary data of level "1" (high) or "0" (low) is stored in the unit cells of the buffer 103 in one-to-one correspondence with the pixels of the display means.

The data processing means of a data processing device employed in the display apparatus capable of changing the driving condition preferably performs the following processing. Video data stored in the memory 102 is read out in units of frames, and simultaneously, video data corresponding to one field is skipped at a predetermined timing. Video data corresponding to L unskipped fields of n fields constituting an ith frame, and video data corresponding to (n–L) fields of n fields constituting an (i+1)th frame are read out as video data corresponding to a new frame. That is, the format of one frame of the input data is changed before conversion to display data. With this processing, even when thinning is performed in units of fields, data can be supplied to the next processing in units of frames. Therefore, even when data is required in units of frames as in pseudo halftone processing, proper processing can be quickly performed.

In addition, the data processing means preferably performs the following processing. As the memory 102, m field memories for storing video data in which a frame consists of n fields in units of fields are prepared. Video data of m fields (i.e., video data corresponding to n most recently changed fields stored in the field memories) is read out, thereby generating display data of one frame. With this processing, independently of the difference between the frame frequency of the input video data and the frame scanning frequency of the display means, the number of fields to be skipped can be minimized.

As an example of the display apparatus according to the present invention, an arrangement for receiving NTSC video data, performing halftone processing, and displaying the data using ferroelectric liquid crystal display elements will be described below.

A ferroelectric liquid crystal display apparatus (to be referred to as an FLCD hereinafter) has, as its characteristic feature, memory properties capable of holding image information which has been displayed once, so that display in a wider area and with a higher resolution than that of a conventional flat panel display apparatus can be performed. Utilizing this characteristic feature, FLCDs are applied as, e.g., a display unit for a desktop document edit system. In one control method of an FLCD, partial rewrite scanning using the unique memory properties of the ferroelectric liquid crystal is performed by selectively scanning only scanning lines where image information has changed. With this arrangement, a response speed sufficient for a terminal display of a computer has been realized in correspondence with lowering of the frame frequency according to an increase in display capacity (e.g., Japanese Laid-Open Patent Application Nos. 63-285141 and 63-65494).

For an FLCD as well, a demand for display of a full-color dynamic image such as a TV image is becoming stronger, in addition to the terminal display of a computer. However, the current commercial FLCD is a binary device which can express only two states, i.e., bright and dark states by one pixel. A halftone display must be realized using a same technique. To express a halftone color by a binary device, many techniques are available such as the above-described "dither method", "error diffusion method", and "average error minimizing method". In all of these methods, the combination of binary dots (pixels) is changed, and the integration function of the human eye is used to allow perception of a pseudo halftone color. Therefore, these techniques are generally called pseudo halftone processing. In principle, an increase in processing speed (LSI) of this technique is made to enable real-time processing, and the technique is applied to a software copying system such as a display apparatus, thereby allowing to display a halftone image, such as a TV image, even on a binary display apparatus.

Intermediate processing is described in, e.g., Japanese Laid-Open Patent Application No. 4-336594.

However, application of such pseudo halftone processing to a display apparatus calls for taking precautions. Video data sent to the display apparatus has various formats. Especially, the order of data transfer is important. For example, a TV image is sent in Japan in accordance with the NTSC system by 2:1 interlaced scanning (interlaced scanning of one frame per two fields. Frame frequency: 30 Hz/field frequency: 60 Hz). Pseudo halftone processing of such data cannot be performed in real time. In most halftone processing techniques except for the general dither method, data from adjacent peripheral pixels must be reflected in determination of the bright/dark state of a given pixel. When pseudo halftone processing of video data such as a TV image corresponding to one field, which is sent every field by interlaced scanning, is performed in real time, error data does not properly propagate to pixels (pixels on an adjacent scanning line) to which the error data should be reflected in one frame, so a proper halftone-processed image can hardly be obtained. After the even and odd fields of video data sent by interlaced scanning are formed into one frame, halftone processing must be sequentially performed from the upper portion of the screen by non-interlaced scanning.

Output of an image which is halftone-processed in units of frames to the FLCD also needs a precaution. In most halftone processing techniques, the relationship with adjacent peripheral pixels is important. In the error diffusion method, error data (error between input video data and processed data) generated upon determining a given pixel propagates (diffuses) to the pixels on the adjacent scanning line and is used as a factor for determining the bright/dark state of pixels on the scanning line. When an image which is properly halftone-processed in units of frames is displayed by so-called interlaced scanning, data of a frame having no causal relation with the upper and lower adjacent scanning lines on the FLCD is simultaneously displayed for a certain period, resulting in an image with poor halftone expression. For this reason, an output to the FLCD must be completely synchronized with the halftone-processed data in units of frames, and rewrite processing must be sequentially performed from the upper portion of the screen by non-interlaced scanning.

Figure 3:
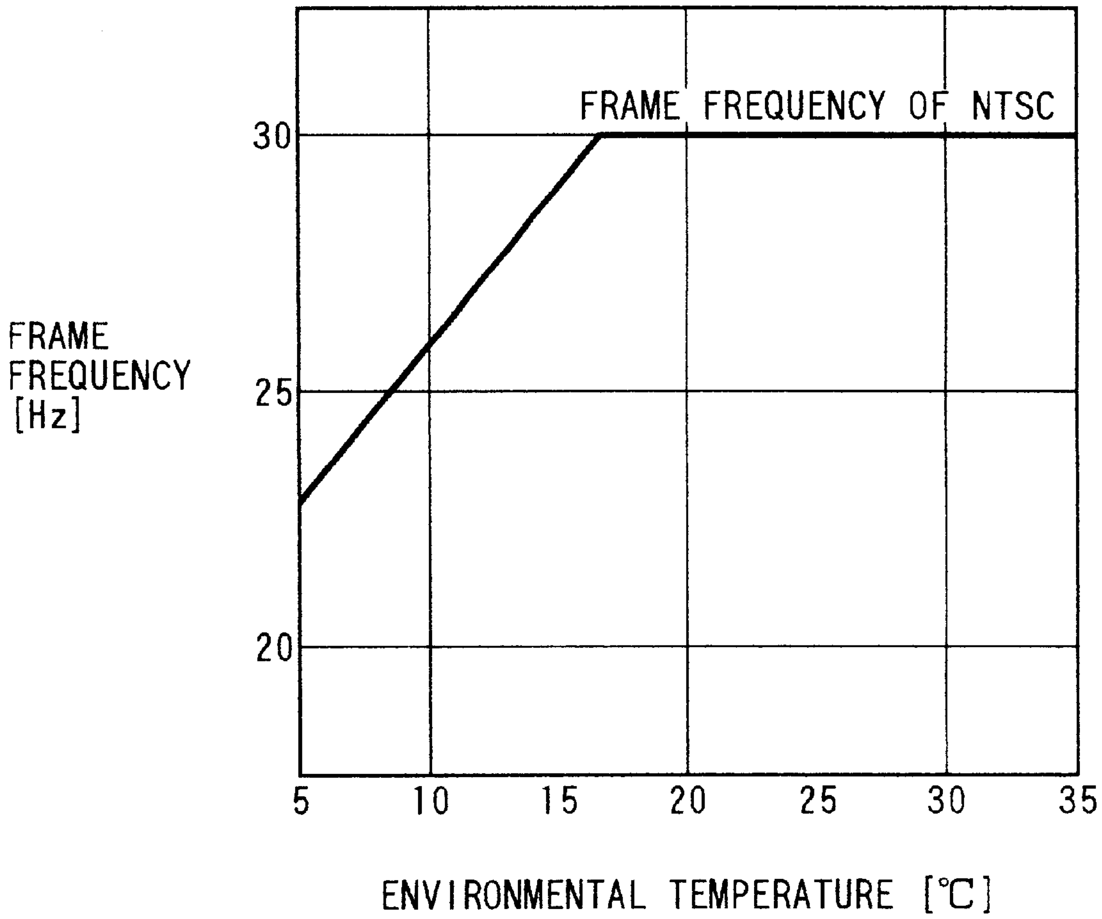
FIG. 3 is a graph showing the frame frequency vs. temperature characteristic of a display element used in the present invention.

The frame frequency (rewrite speed) of the FLCD changes in accordance with the environmental temperature. FIG. 3 is a graph showing an example. In FIG. 3, the frame frequency of the FLCD is about 23 Hz at an environmental temperature of 5° C. (frame frequency for 512 scanning lines of a TV image), and about 26 Hz at 10° C. The frame frequency is 30 Hz or more when the temperature exceeds 15° C. FIG. 3 shows the frame frequency a sufficient time after the power is turned on. Immediately after the power is turned on, the frame frequency inevitably becomes slightly lower than that shown in FIG. 3. When a TV image sent at a predetermined period is to be input to the FLCD having a changeable frame frequency, if the environmental temperature of the FLCD is 15° C. or more, the frame frequency exceeds 30 Hz which is the frame frequency of a TV image, so no problem is posed. However, when the environmental temperature is 15° C. or less, the frame frequency of the FLCD becomes lower than 30 Hz. For this reason, each frame of the TV image sent at a period of 30 Hz cannot be completely displayed.

According to each embodiment to be described below, in a display apparatus for displaying a TV image or the like after pseudo halftone processing on a display panel with a frame frequency depending on the temperature, a frame graver memory serving as a video data memory means for synthesizing video data input by interlaced scanning into video data of one frame and storing the video data, and a frame memory serving as a display data memory means for storing display data after intermediate processing are provided as a double buffer structure. When the frame frequency of the display panel is lower than that of the input image (e.g., 30 Hz for a TV image), write or read access to the frame graver memory is skipped, i.e., write or read processing is inhibited in units of fields of the input image. In this manner, by changing the field arrangement of one frame as a unit for pseudo halftone processing, smooth dynamic image display of input video data can be realized on the display panel with an asynchronous and changeable frame frequency while maintaining the image quality of intermediate processing high.

First Embodiment

Figures 4, 4A, 4B:
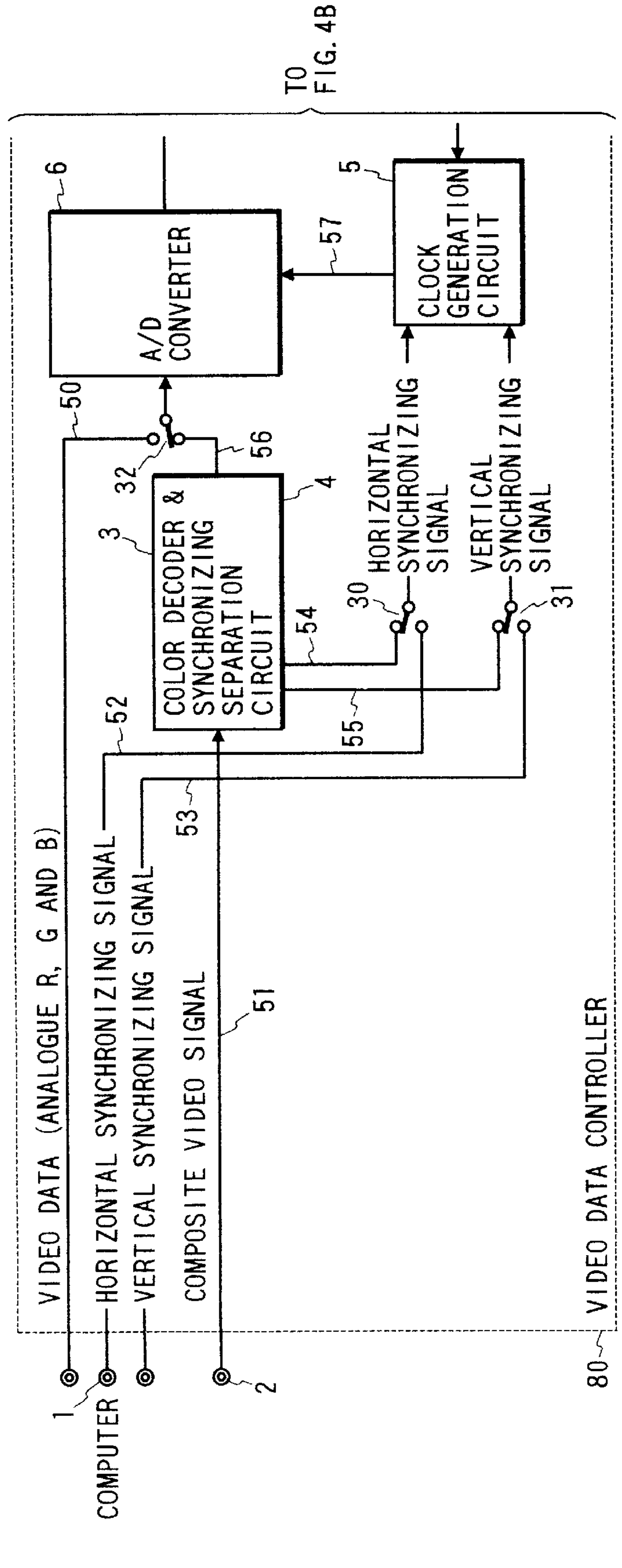
FIG. 4 is comprised of FIGS. 4A and 4B showing block diagrams of a display apparatus according to the first embodiment of the present invention.
Figure 4B:
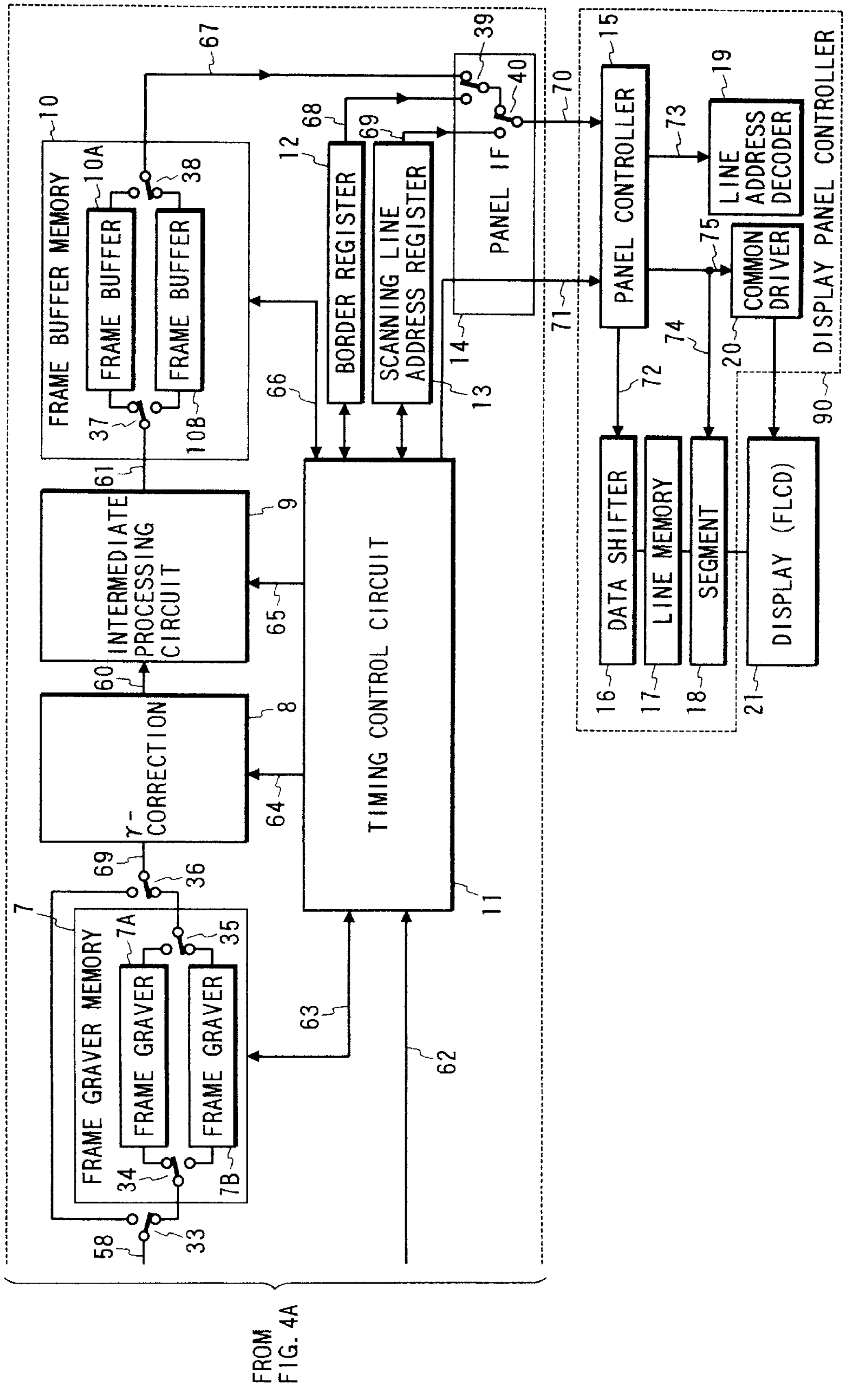

FIGS. 4A and 4B are block diagrams showing an embodiment of the present invention. Referring to FIGS. 4A and 4B, this apparatus includes an input unit 1 for receiving video data, a horizontal synchronizing signal, and a vertical synchronizing signal from a workstation (WS) or a personal computer serving as a host machine, an input unit 2 for receiving a composite video signal based on the NTSC system from a television (TV) tuner or an optical disk (LD), an FLCD 21 serving as a display means, a video data controller 80 corresponding to a data processing device of the present invention, and a display panel controller 90.

The video data controller 80 includes a color decoder 3 for converting TV video data into analog R, G, and B signals, a synchronizing separation circuit 4 for extracting horizontal and vertical synchronizing signals from the TV video data, a clock generation circuit 5 for generating a system clock from the horizontal and vertical synchronizing signals, and an A/D converter 6. A frame graver memory 7 has a double buffer structure for synthesizing TV video data corresponding to two fields sent by interlaced scanning into data of one frame and storing the video data. A γ-correction circuit 8 converts video data with γ-characteristics into data with linear (γ=1) characteristics. A circuit 9 performs pseudo halftone processing such as error diffusion processing in real time (within a period corresponding to one frame of NTSC data) and corresponds to a data processing means of the present invention. A frame buffer memory 10 has a double buffer structure for storing video data after pseudo halftone processing. A control circuit 11 controls the entire video data controller 80, i.e., timing management of read/write access to each memory, setting of parameters for pseudo halftone processing, or video data transfer to the display unit, and serves as a convert means for changing the relationship between video data and display data. A border register 12 stores display data outside of the effective display area (frame portion) of the FLCD. A scanning line address register 13 stores data for designating a scanning line of the FLCD. A panel interface 14 transmits/receives video data, synchronizing signals, and the like to/from the display panel controller 90.

This system also includes video data 50 (analog R, G, and B-signals) from the host machine, a NTSC composite video signal 51 such as a TV image, horizontal and vertical synchronizing signals 52 and 53 from the computer, horizontal and vertical synchronizing signals 54 and 55 extracted from the composite video signal by the synchronizing separation circuit 4, video data 56 converted into analog R, G, and B signals by the color decoder, a conversion clock 57 for the A/D converter, video data (digital R, G, and B signals) 58 after A/D conversion, video data 59 (digital R, G, and B signals) after A/D conversion or read out from the frame graver memory 7, video data 60 converted by the γ-correction circuit 8 to attain linear (γ=1) characteristics, video data 61 as display data after pseudo halftone processing, a fundamental clock 62, a control signal 63 for the frame graver memory, a control signal 64 for setting the y value to the γ-correction circuit, a control signal 65 for the pseudo halftone processing circuit, a control signal 66 for the frame buffer memory, display data 67 read out from the frame buffer memory 10, display data 68 outside of the effective display area (frame portion) of the FLCD, scanning line address data 69 of the FLCD, data 70 to be sent to the display panel controller 90 (scanning line address data or display data), and a synchronous or control signal 71 for the display panel controller 90.

Switches 30 and 31 switch between the horizontal and vertical signals of a computer and those of the TV, respectively. A switch 32 switches between video data to be input from the computer to the A/D converter and that to be input from the TV to the A/D converter. Switches 33 and 36 select whether or not video data from the computer or a TV signal is transmitted through the frame graver memory. Switches 34 and 35 switch write/read access to the memory such that two frame graver memories 7A and 7B function as a double buffer. Switches 37 and 38 switch write/read access to the memory such that two frame buffer memories 10A and 10B function as a double buffer. A switch 39 selects, as display data, display data read out from the frame buffer memory 10 or the display data 68 outside of the effective display area. A switch 40 is used to add the scanning line address data 69 to display data to be sent to the display panel controller 90.

The display panel controller 90 serves as a setting means for setting a driving condition in the present invention. A panel controller 15 generally manages the driving conditions for the display panel, such as an interface to the video data controller 80 and control of segment and common drivers. A data shifter 16 transfers display data corresponding to one line from the panel controller 15. A line memory 17 stores the display data corresponding to one line. A segment driver 18 outputs a predetermined driving waveform to an information electrode of the display panel 21 at a predetermined timing in accordance with the display data stored in the line memory 17. A line address decoder 19 selects a predetermined scanning line of the display panel in accordance with scanning line address data from the panel controller 15. A common driver 20 outputs a predetermined driving waveform to a selected scanning line (scanning electrode) at a predetermined timing. The FLCD 21 uses a ferroelectric liquid crystal (FLC). The display panel controller 90 also includes display data 72, scanning line address data 73, and control lines 74 and 75 to the segment and common drivers 18 and 20.

The basic video data flow in display of image data from a computer or TV will be described below with reference to FIGS. 4A and 4B. In a computer, video data consisting of analog R, G, and B signals and horizontal and vertical synchronizing signals are normally output to the display apparatus. In a TV, an NTSC composite signal is output, as described above. Video data from the computer is directly guided to the A/D converter 6. However, as for a TV signal, after the horizontal and vertical synchronizing signals 54 and 55 are separated from the composite video signal 51 by the synchronizing separation circuit 4, the data is converted into the video data 56 consisting of analog R, G, and B signals by the color decoder 3 and sent to the A/D converter 6. The switch 32 is used to select video data to be input to the A/D converter 6 and switches between the computer image and the TV image.

The horizontal and vertical synchronizing signals from the computer or TV are selected by the switches 30 and 31 and input to the clock generation circuit 5. The clock generation circuit 5 is constituted by a PLL (Phase Locked Loop) or VCO (Voltage Controlled Oscillator) module and generates the conversion clock 57 for the A/D converter or the clock 62 necessary for the system from the input horizontal and vertical synchronizing signals. Video data from a workstation often has a dot clock of 100 MHz or more (=conversion clock frequency for the A/D converter). In this embodiment, therefore, the clock generation circuit is designed to cope with a clock frequency up to 140 MHz.

The video data input to the A/D converter is sequentially converted into the digital video data 58 consisting of 6-bit R, G, and B signals in accordance with the conversion clock 57 from the clock generation circuit 5. The switches 33 and 36 select whether the A/D-converted video data 58 is temporarily stored in the frame graver memory 7 or not. A TV image is stored in the frame graver memory 7 by switching the switches. The frame graver memory 7 synthesizes even and odd fields of video data sent by interlaced scanning into one frame, so that halftone processing at the subsequent stage is performed in units of frames. As for computer image data, an image is sent in units of frames by non-interlaced scanning. This data need not pass through the frame graver memory 7 and is therefore directly guided to the γ-correction circuit 8.

For both computer image data and TV image data, input video data is often added in advance with characteristics representing γ=0.45 (reciprocal of γ=2.2) in consideration of data output to a CRT having non-linear electro-optical conversion characteristics, e.g., γ value=2.2. In this case, the γ value of the video data 59 must be corrected by the γ-correction circuit 8 in accordance with the linear (γ=1) electrooptic conversion characteristics of the FLCD. The γ-correction circuit 8 employs a look-up table (LUT) system using a high-speed SRAM and is designed to receive parameters for correction from the control circuit 11.

The γ-corrected video data 60 is input to the halftone processing circuit 9, and pseudo halftone processing is performed in real time (within a period corresponding to one frame of NTSC data). In this embodiment, the error diffusion method is used for pseudo halftone processing. In this method, binarization is performed to minimize density (luminance) errors between the input multivalued video data and display data after binarization. With this method, high-quality halftone expression is enabled considering the resolution of the FLCD as an output device.

After pseudo halftone processing, the display data 61 on the FLCD is written in the frame buffer memory 10 in units of frames. The frame buffer memory 10 for storing display data after halftone processing is controlled to function as a co-called double buffer, so that while the display data 61 after halftone processing is being written in one frame buffer memory, display data can be output from the other frame buffer memory to the FLC panel unit 90. The write frame buffer memory and the read frame buffer memory are alternately switched in units of frames (screens) of the FLCD.

The display data stored in the frame buffer memory 10 is read out from the read frame buffer memory 10A or 10B in units of lines in accordance with an instruction from the control circuit 11, added with the display data 68 outside of the effective display area and the scanning line address data 69 through the panel interface 14, and output to the display panel controller 90. If an interpolation expansion processing circuit (not shown) is arranged at the subsequent stage of the A/D converter 6 to convert the resolution of the input image in accordance with the number of pixels of the FLCD 21, the frame graver memory 7 must have a size corresponding to the number of pixels of the FLCD 21. Normally, the resolution of the input image is smaller than the number of pixels of the FLCD, so the number of memories increases. However, the display data 68 outside of the effective display area need not be added. In addition, the quality of the image after halftone processing is improved. The panel controller 15 in the display panel controller 90 receives the scanning line address data and the display data from the video data controller 80 and transfers the scanning line address data 73 to the line address decoder 19 of the scanning electrode driving circuit (19 and 20) and the display data 72 to the data shifter 16 of the information electrode driving circuit (16 to 18). The line address decoder 19 of the scanning electrode driving circuit selects a predetermined scanning line on the basis of the scanning line address data 73. The common driver 20 outputs a predetermined driving waveform to the selected scanning line for a selected period of time (for one horizontal scanning period). Upon completion of shift of display data corresponding to one line, the data shifter 16 of the information electrode driving circuit transfers the display data to the line memory 17 and holds it for one horizontal scanning period. The segment driver 18 outputs a driving waveform corresponding to the display data stored in the line memory 17 in synchronism with the selected period of the common driver 20. In this manner, by well-known line sequential scanning, the computer image or TV image is displayed on the FLCD 21.

The basic flow of computer image data and TV image data has been described above. Next, timing management for synchronizing input video data with display data while maintaining the image quality of halftone processing will be described.

Figure 5:
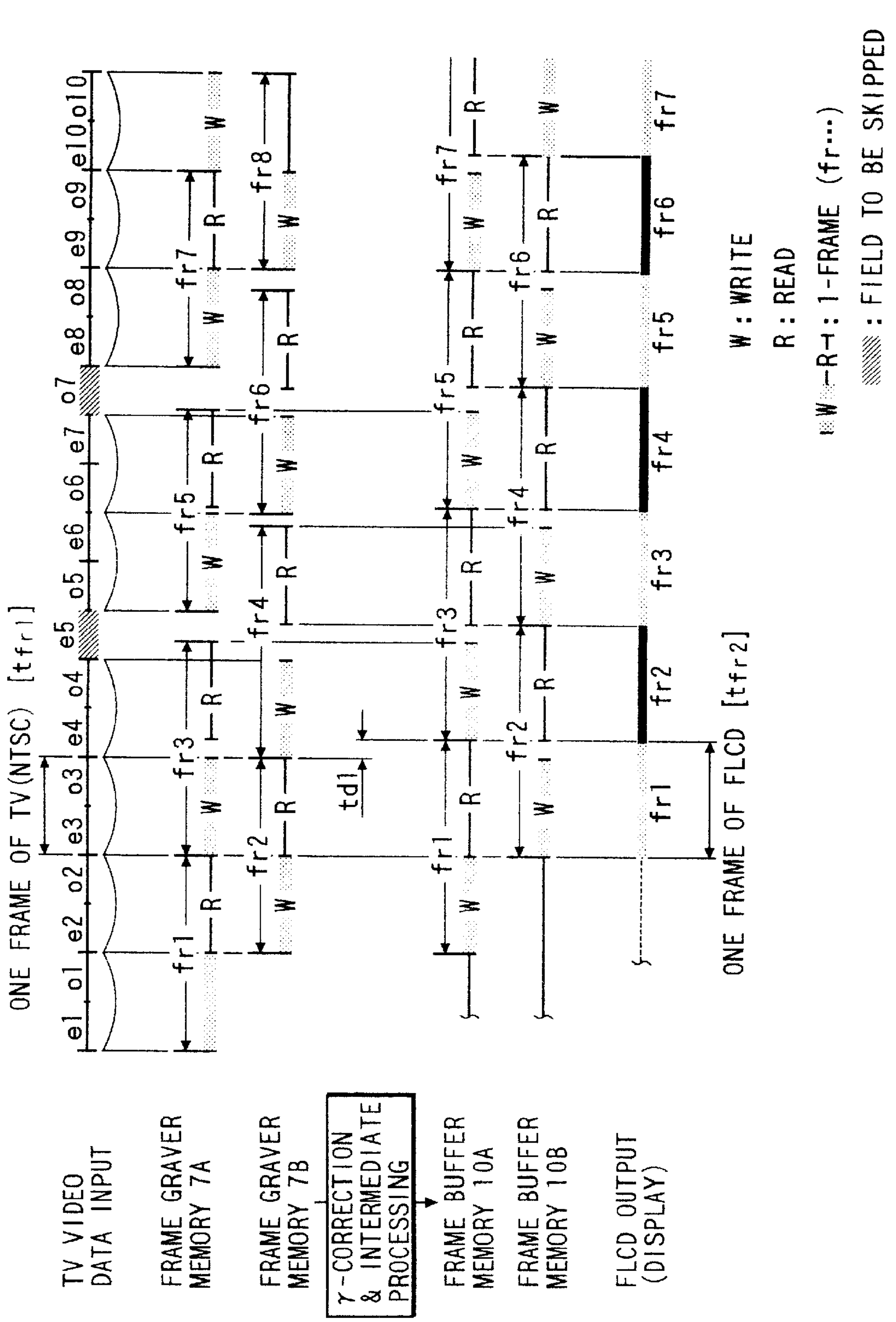
FIG. 5 is a timing chart showing a processing flow from video data input to data output to a display panel in the block diagrams shown in FIGS. 4A and 4B.

FIG. 5 is a timing chart showing an operation flow from video data input to data output to the FLCD in the block diagram shown in FIGS. 4A and 4B. Referring to FIG. 5, e1, o1, e2, o2, . . . , ex, and ox represent the even and odd fields of the first frame, the even and odd fields of the second frame, . . . , and the even and odd fields of the xth frame of an input NTSC signal, respectively, and fr1, fr2, . . . , and frx represent frame units to be output to the FLCD after pseudo intermediate processing. W and R represent write and read accesses to the memory.

In FIG. 5, the frame graver memories 7A and 7B alternately synthesize A/D-converted video data corresponding to two fields into one frame data and store the data ("W" in FIG. 5). The video data of one frame stored in the frame graver memories are sequentially read out by non-interlaced scanning ("R" in FIG. 5), converted into the display data 6 for the FLCD by γ-correction and pseudo halftone processing, and written in the frame buffer memories 10A and 10B. At this time, γ-correction and pseudo halftone processing are performed within one frame period of NTSC data. The display data written in the frame buffer memory 10A are alternately read out in accordance with the speed of the FLCD, added with scanning line address data and the like, sent to the display panel controller, and displayed on the FLCD.

Figure 6:
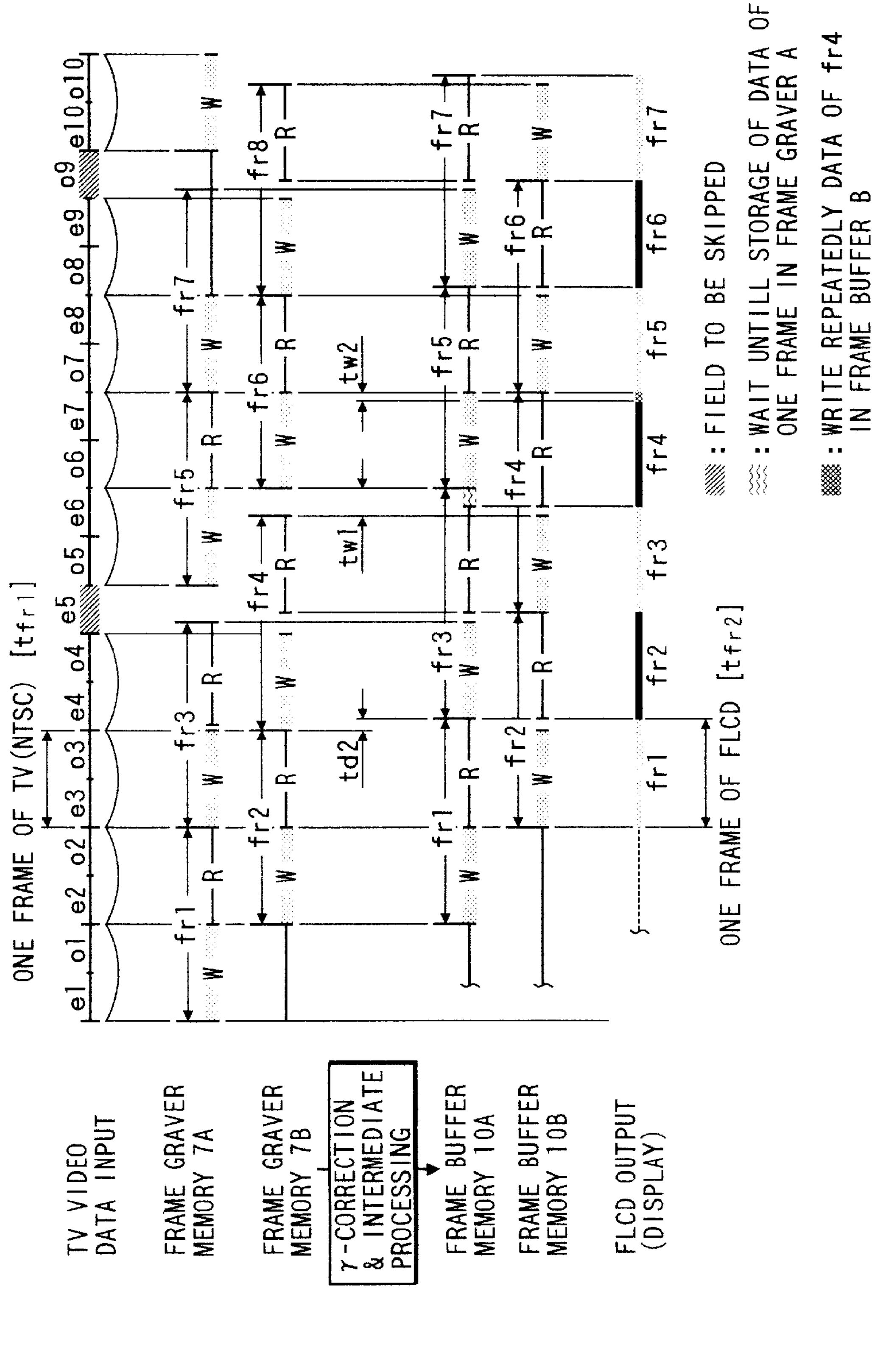
FIG. 6 is a timing chart showing another processing flow from video data input to data output to the display panel in the block diagram shown in FIGS. 4A and 4B.

As described above, the frame frequency of the FLCD is different from that of NTSC data, and lower than that of NTSC data at an environmental temperature of 15° C. or less (FIG. 6). In FIG. 5, tfr1 is one frame period of NTSC data, and tfr2 is one frame period of the FLCD. In a low-temperature range, tfr1<tfr2, and a time difference td1 is generated. Basically, odd frames (e1–o1, e3–o3, e5–oS, . . . ) are stored in the frame graver memory 7A, and even frames (e2–o2, e4–o4, e6–o6, . . . ) are stored in the frame graver memory 7B, alternately. The data are synthesized (frozen) in units of frames and sent to the subsequent stage for intermediate processing by non-interlaced scanning. In fact, however, video data of a field to be stored in a corresponding memory cannot be stored due to the time difference.

In FIG. 5, video data of field e5 cannot be stored in the corresponding memory. The video data of field 5e must be stored in the frame graver memory 7A. However, at the time of input of the video data of field e5, read processing of video data (frame fr3 consisting of fields e3–o3) previously held in the frame graver memory 7A, i.e., transfer of the video data to the next stage for intermediate processing is not completed yet due to the accumulated time differences between frames. For this reason, field e5 cannot be stored in the memory. As described above, until video data corresponding to one frame, which is temporarily stored, is completely read out, and intermediate processing is completed, any new field cannot be stored in the memory. This is because no proper halftone expression can be obtained unless halftone processing is performed after video data of one frame is completely frozen. In such a case, therefore, the video data of field e5 is skipped not to be written in the frame graver memory, and video data of two fields o5–e6 which are sent subsequently are synthesized into video data of one frame and held. Accordingly, the frame graver memory 7B synthesizes data of fields o6–e7 into video data of one frame and holds the data. As a result, one frame is formed while shifting one field. In FIG. 5, a similar timing is generated in field o7. The frame graver memory 7A similarly operates to skip the video data of field o7.

In this manner, when the frame frequency of the FLCD is lower than that of NTSC data, not all the input frames can be displayed. When the display data to the panel is skipped in units of frames, the motion of an image, and particularly a dynamic image, becomes unnatural. According to this embodiment, when the frame frequency of the FLCD is lower than that of NTSC data at a low environmental temperature, the input data is skipped not in units of frames but in units of fields. Therefore, the unnaturalness of motion display can be minimized. At the same time, since halftone processing is performed after video data of one frame is completely frozen, high-quality halftone expression can be realized. Such skipping, i.e., a change in relationship between input video data and display data is controlled by the timing control circuit 11 serving as a convert means.

FIG. 6 is a timing chart showing a case wherein the difference between the frame frequency of the FLCD and that of NTSC data is small. In this case, the difference between the frame frequencies is smaller than that in FIG. 5, and the frequency of skipped fields decreases accordingly. However, such a timing is generated that, even after completion of write processing of one frame in the FLCD, display data of next frame is not ready. In FIG. 6, period tw2 immediately after the display data of frame 4 (fr4) is written in the FLCD is the timing. The reason why this timing is generated is that field e5 is skipped, so that synthesis, storing, and intermediate processing of the next image data (field 5 (fr5)) are delayed and not completed before the data of frame 4 (fr4) is completely written in the FLCD. When such a timing is generated, the image quality on the FLCD can be maintained satisfactory by performing control such that refresh write processing for repeatedly displaying the display data of frame fr4 until the display data of frame fr5 is ready.

Second Embodiment

Figure 7:
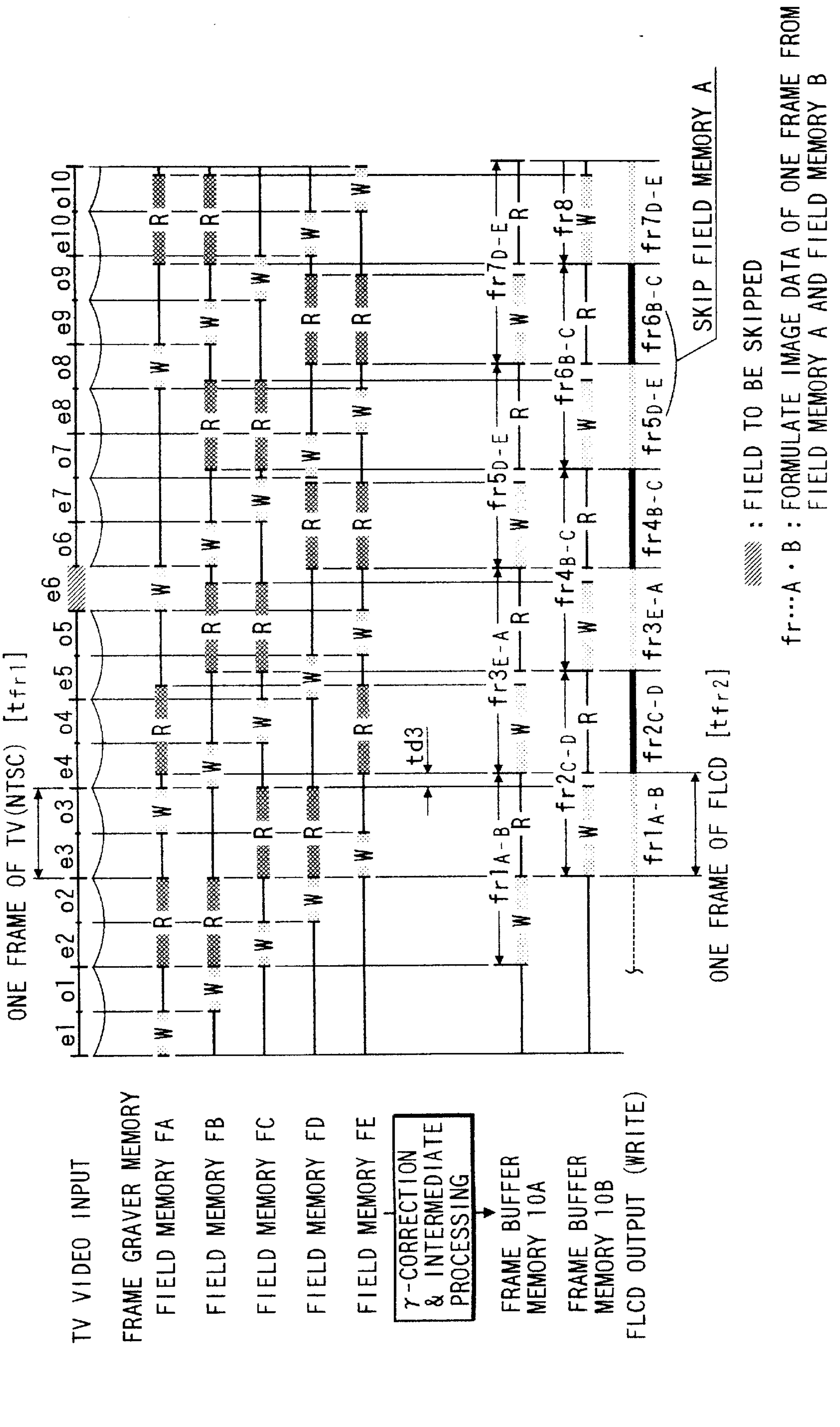
FIG. 7 is a timing chart showing a processing flow from video data input to data output to a display panel in the second embodiment of the present invention.
Figure 8:
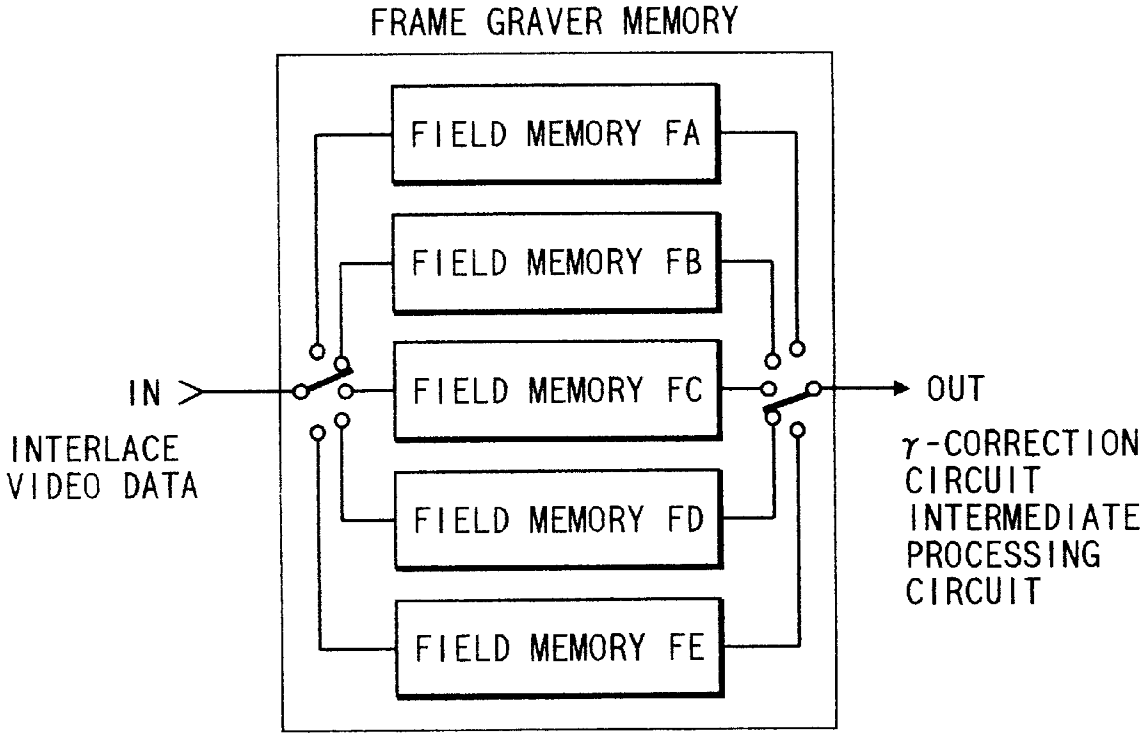
FIG. 8 is a view showing the structure of a frame graver memory according to the second embodiment.

FIG. 7 is a timing chart for showing an operation flow of another embodiment. In this embodiment, a frame graver memory has five field memories capable of storing NTSC video data corresponding to one field, as shown in FIG. 8. Symbols in FIG. 7 are basically the same as those in FIGS. 5 and 6, and fr1 AB means that video data stored in field memories FA and FB constitute one frame (fr1). In this embodiment, the input video data are circularly stored in the field memories FA→FB→FC→FD→FE→FA→FB→FC→ . . . in units of fields. When write access to the FLCD is completed, the latest video data corresponding to two fields is processed as video data of one frame, thereby the number of fields to be skipped independently of the time difference between the frame frequency of the FLCD and that of NTSC data.

In FIG. 7, consider a timing when data of one frame (fr5) is formulated from the field memories FD and FE, intermediate processing is completed (when "W" ends), and the display data (fr4) in a frame buffer memory 10B is completely written in the FLCD. At that point of time, new video data (halftone processing is not performed yet) are stored in the three field memories FA, FB, and FC in the frame graver memory. In this case, the video data in the field memory FA is abandoned, and video data of one frame is formed from the video data in the field memories FB and FC, intermediate processing is performed, and the data is stored in the frame buffer memory 10A as display data for the FLCD.

In this embodiment, unlike the frame graver memories 7A and 7B of the first embodiment, write access to the frame graver memories is not inhibited, and instead, input video data of all fields are circularly stored. Data of one frame is formed from the latest data in two field memories and sent to the next stage for intermediate processing. For this reason, although the required memory capacity increases, a wait time for preparation of display data for the FLCD is eliminated, unlike the first because the latest video data is always held. Therefore, smoother dynamic image display can be performed.

According to the above-described first and second embodiments, in a display apparatus for displaying a TV image or the like after pseudo intermediate processing on a display panel with a frame frequency asynchronous and changeable with respect to an input image, a frame graver memory for synthesizing input video data into video data of one frame and storing the video data, and a frame memory for storing display data after intermediate processing are provided as a double buffer structure. By controlling the write/read timing of each memory means, the frame of input image is synchronized with that of the display panel. With this processing, smooth dynamic image display can be performed while maintaining prescribed image quality of pseudo intermediate processing.

According to the present invention, even when the driving condition changes, no error is generated in data processing, so that satisfactory display can be performed.

What is claimed is:

1. A data processing method for use in a display apparatus for storing input video data and outputting display data based on the stored video data to display means, comprising the steps of:

changing a relationship between the video data and the display data in response to a driving condition set by setting means for setting the driving condition for said display means, wherein the video data is data with a frame consisting of a plurality of field;

thinning the video data in units of fields and converting into the display data for said display means driven at a frame frequency lower than that of the video data, and reading out, and subjecting the video data to at least one of a pseudo halftone processing or γ-correction per frame.

2. A method according to claim 1, wherein said step of thinning of the video data is performed by inhibiting write processing of the video data in a memory means.

3. A method according to claim 1, wherein said step of thinning of the video data is performed by inhibiting read processing of the video data stored in memory means.

4. A data processing device for use in a display apparatus for storing input video data and outputting display data based on the stored video data to display means, comprising:

convert means for changing a relationship between the video data and the display data in response to a driving condition set by setting means for setting the driving condition for said display means, wherein the video data is data with a frame consisting of a plurality of fields, and the video data is thinned in units of fields and converted into the display data for said display means driven at a frame frequency lower than that of the video data, and said data processing device subjects the video data read out to at least one of a pseudo halftone processing or γ-correction per frame.

5. A device according to claim 4, wherein thinning of the video data is performed by inhibiting write processing of the video data in a memory means.

6. A device according to claim 4, wherein thinning of the video data is performed by inhibiting read processing of the video data stored in memory means.

7. A display apparatus for storing input video data and outputting display data based on the stored video data to display means, comprising setting means for setting a driving condition for said display means, and convert means for changing a relationship between the video data and the display data in response to the driving condition set by said setting means, wherein the video data is data with a frame consisting of a plurality of fields, and the video data is thinned in units of fields and converted into the display data for said display means driven at a frame frequency lower than that of the video data, and said display device subjects the video data read out to at least one of a pseudo halftone processing or γ-correction per frame.

8. An apparatus according to claim 7, wherein said display means is a display element capable of changing a frame scanning frequency in accordance with an environmental condition.

9. An apparatus according to claim 7, wherein said display means is a chiral smectic liquid crystal display element.

10. An apparatus according to claim 7, wherein said display means is a display element having a ferroelectric liquid crystal arranged between electrodes.

11. An apparatus according to claim 7, wherein thinning of the video data is performed by inhibiting write processing of the video data in a memory means.

12. An apparatus according to claim 7, wherein thinning of the video data is performed by inhibiting read processing of the video data stored in memory means.

13. A display apparatus having display means, video data memory means for storing video data in which a frame consists of a plurality of fields, display data memory means for storing display data to be displayed on said display means, and data processing means for performing read processing of the video data stored in said video data memory means in units of frames to generate the display data to be stored in said display data memory means, comprising:

setting means for setting a driving condition for said display means, and means for thinning the video data in units of fields in response to the predetermined driving conditions set by said setting means, and said display device subjects the video data read out to at least one of a pseudo halftone processing or γ-correction per frame.

14. A data processing device for use in a display apparatus, comprising video data memory means for storing video data in which a frame consists of n fields, display data memory means for storing display data to be displayed on display means, data processing means for performing read processing of the video data stored in said video data memory means in units of frames to generate the display data to be stored in said display data memory means, and means for thinning the video data in units of fields, wherein said data processing means reads out video data corresponding to one frame from said video data memory means, the video data consisting of video data of L fields of the n fields constituting an ith frame and video data of (n−L) fields of the n fields constituting an (i+1)th frame, and wherein the video data is data with a frame consisting of a plurality of fields, and the video data is thinned in units of fields and converted into the display data for said display means driven at a frame frequency lower than that of the video data, and said data processing device subjects the video data read out to at least one of a pseudo halftone processing or γ-correction per frame.

15. A data processing device for use in a display apparatus, comprising video data memory means including m field memories for storing video data in which a frame consists of n fields in units of fields, display data memory means for storing display data of at least one frame to be displayed on display means, and data processing means for performing read processing of the video data stored in said video data memory means in units of frames to generate the display data to be stored in said display data memory means, and wherein display data of one frame is generated by reading and processing video data of n latest fields of video data of m fields stored in the m field memories, and wherein the video data is data with a frame consisting of a plurality of fields, and the video data is thinned in units of fields and converted into the display data for said display means driven at a frame frequency lower than that of the video data, and said data processing device subjects the video data read out to at least one of a pseudo halftone processing or γ-correction per frame.

16. An apparatus according to claim 13, wherein said data processing means has a circuit for performing halftone processing.

17. A device according to claim 14, wherein said data processing means has a circuit for performing halftone processing.

18. A device according to claim 15, wherein said data processing means has a circuit for performing halftone processing.

19. A display apparatus having a display panel constituted by arranging scanning signal electrodes and information signal electrodes in a matrix and sandwiching, between said electrodes, a liquid crystal having memory properties and temperature dependence on a driving condition, and driven by applying a scanning signal and an information signal to said scanning signal electrodes and said information signal electrodes, respectively, comprising:

video data memory means for synthesizing video data which is input while being divided into a plurality of fields into video data of one frame and storing the video data;

halftone processing means for reading the video data of one frame from said video data memory means and performing halftone processing to convert the video data into display data for said display panel;

display data memory for storing the display data;

driving setting means for setting the driving condition for said display panel; and video data control means for detecting the driving condition for said display means in accordance with a signal from said driving setting means and controlling write/read processing to/from said video data memory means so that the input video data is thinned in units of fields, with any given frame of the input video data having no more than one field thinned.

20. An apparatus according to claim 19, wherein said video data memory means comprises a plurality of frame memories.

21. An apparatus according to claim 19, wherein said video data memory means comprises a plurality of field memories.

22. An apparatus according to claim 19, wherein said video data memory means comprises a plurality of dual port memories.

23. An apparatus according to claim 19, wherein said display data memory means comprises a plurality of dual port memories.

24. An apparatus according to claim 19, wherein said intermediate processing means uses an error diffusion method.

25. An apparatus according to claim 19, wherein said display panel is a ferroelectric liquid crystal panel.

26. An apparatus according to claim 19, wherein said display panel is a panel having a chiral nematic liquid crystal which exhibits two metastable states.

27. An apparatus according to claim 19, wherein said display panel is a panel using a chiral smectic liquid crystal.

* * * * *

UNITED STATES PATENT AND TRADEMARK OFFICE

CERTIFICATE OF CORRECTION

PATENT NO. : 6,310,651 B1 
DATED : October 30, 2001
INVENTOR(S) : Atsushi Mizutome It is certified that error appears in the above-identified patent and that said Letters Patent is hereby corrected as shown below:

Column 1,
Line 50, "enable" should read -- enable a --.

Column 3,
Line 49, "According" should read -- According to --.

Column 5,
Line 6, "perform" should read -- perform a --; and
Line 8, "its-memory" should read -- its memory --.

Column 9,
Line 1, "y" should read -- $\gamma$ --.

Column 11,
Line 64, "e5-os," should read -- e5-o5, --.

Column 12,
Line 60, "satisfactory" should read -- satisfactorily --.

Column 13,
Line 4, "frl AB" should read -- $fr1_{A\text{-}B}$ --;
Lines 23, 31, 39, 44 and 50, "intermediate" should read -- halftone --; and
Line 64, "field;" should read -- fields; --.

Signed and Sealed this

Eighteenth Day of June, 2002

*Attest:*

JAMES E. ROGAN

*Attesting Officer* *Director of the United States Patent and Trademark Office*